Sept. 8, 1970   J. R. ALBURGER   3,527,709
FLUORESCENT TRACER PROCESS AND COMPOSITIONS
Original Filed Oct. 4, 1965

INVENTOR.
James R. Alburger

United States Patent Office 3,527,709
Patented Sept. 8, 1970

3,527,709
FLUORESCENT TRACER PROCESS
AND COMPOSITIONS
James R. Alburger, 5007 Hillard Ave.,
La Canada, Calif. 91011
Continuation-in-part of application Ser. No. 532,611,
Mar. 8, 1966, which is a division of application
Ser. No. 492,674, Oct. 4, 1965, now Patent No.
3,386,920. This application Jan. 14, 1969, Ser.
No. 790,939
Int. Cl. C09k 1/02
U.S. Cl. 252—301.2         4 Claims

ABSTRACT OF THE DISCLOSURE

In an inspection process, the method step of employing fluorescent inspection tracers, in which at least one of the compounds fluoranthene and pyrene is dissolved in a liquid carrier to a concentration between about .001 gram per pint and about 25 grams per pint. Pyrene and fluoranthene yield novel and useful fluorescence response effects in a wide variety of organic solvents, as compared with ordinary dye sensitizers, as, for example, their ability to yield a "linear" sensitivity response with respect to dilution, such that even at concentrations as small as about .001 gram per pint, solutions of the compounds exhibit substantial degrees of dimensional sensitivity.

RELATED PATENTS AND PATENT APPLICATIONS

Figure 1:
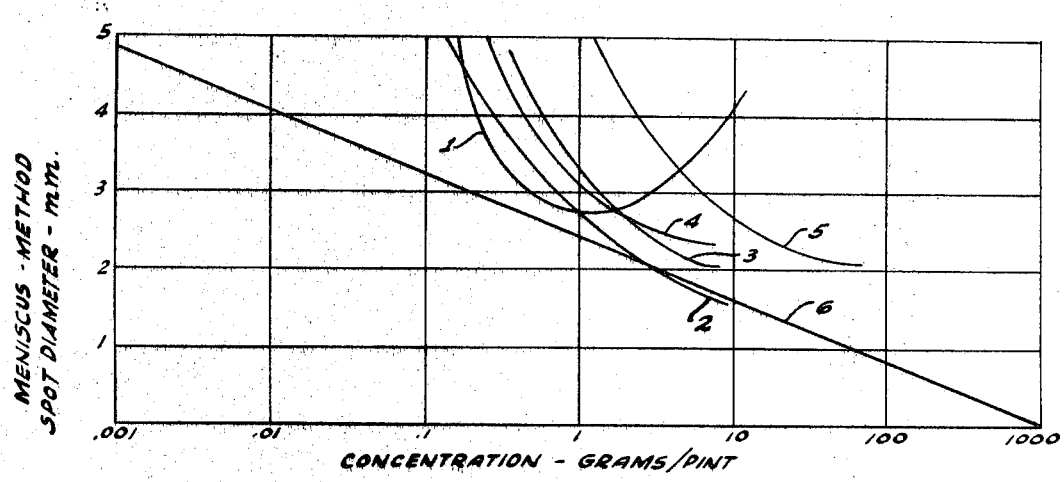

U.S. Pat. No. 3,107,298, for "Apparatus for the Measurement of Fluorescent Tracer Sensitivity," U.S. Pat. No. 3,386,920, for "Fluorescence Detection of Extremely Small Flaws," and application Ser. No. 532,611, filed Mar. 8, 1966, for "Fluorescent Tracer Chemicals" (parent application).

The present application is a continuation-in-part of my application, Ser. No. 532,611, filed Mar. 8, 1966, for "Fluorescent Tracer Chemicals," now abandoned, which application was a division of my application, Ser. No. 492,674, filed Oct. 4, 1965, for "Process for Fluorescence Detection of Extremely Small Flaws," now issued Pat. No. 3,386,920, which latter application was a continuation-in-part of my application, Ser. No. 323,529, filed Nov. 13, 1963, for "Fluorescent Tracers," which previous application was a continuation-in-part of my application, Ser. No. 149,061, filed Oct. 31, 1961, for "Fluorescent Tracers," which last application was a continuation-in-part of my application, Ser. No. 82,374, filed Jan. 13, 1961, for "Fluorescent Penetrant Tracers," all now abandoned.

The present invention relates to fluorescent tracer chemicals, and more particularly to two specific fluorescent chemical materials; namely, fluoranthene and pyrene, which have unique properties with respect to their solvency characteristics and their fluorescence performance under ultraviolet excitation.

A large number of fluorescent sensitizers or dyes are known in the art which are useful for various tracer applications in connection with fluorescent penetrants, leak tracers, inks, marking materials, crayons, surface coaters, etc. Many of these have been described in my above-mentioned issued patent, No. 3,386,920. This above-mentioned patent describes and claims a mode of usage for various sensitizers, including fluoranthene and pyrene, wherein said sensitizers are dissolved in a suitable carrier to a concentration of at least about 15 grams per pint of carrier material (25 grams per pint in the case of fluoranthene) and up to the limit of solubility thereof.

The present invention contemplates the use of fluoranthene and pyrene as fluorescent tracers in various solvent vehicles at concentrations from about 15 grams per pint or less down to about .001 gram per pint (25 grams per pint or less in the case of fluoranthene).

The principal object of this invention, therefore, is to provide fluorescent tracer compositions which are useful at relatively low concentrations.

Another object of the invention is to provide fluorescent tracer compositions which yield high efficiency in fluorescence response under ultraviolet excitation.

Still another object of the invention is to provide fluorescent tracer compositions which have low solubility in water.

A further object of the invention is to provide fluorescent tracer compositions which are low in cost.

A still further object of the invention is to provide fluorescent tracer compositions which exhibit "linear" dilution characteristics.

An additional object of the invention is to provide fluorescent tracer compositions which are useful as reference materials for fluorescent brightness measurement and comparison evaluation.

Figure 2:
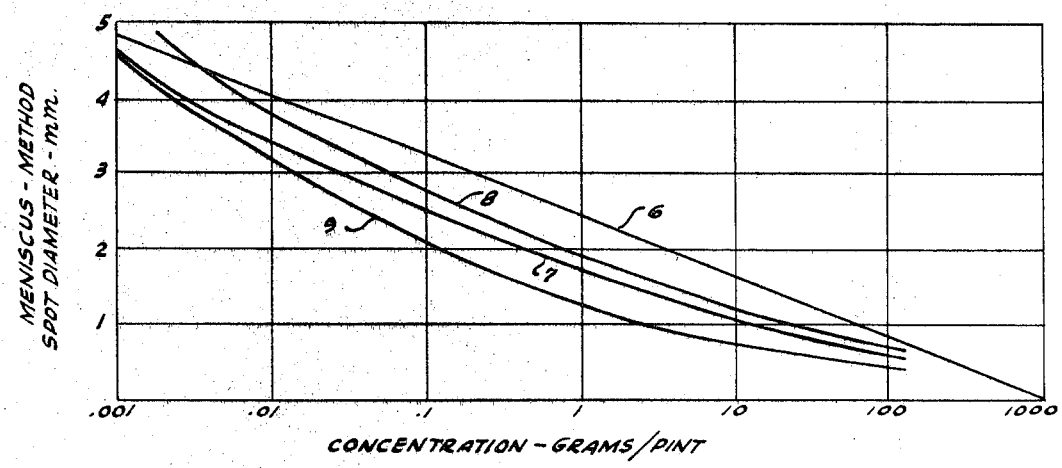

These and other objects of the invention will become more apparent from the following description thereof when read in conjunction with the accompanying drawings, in which:

FIG. 1 is a chart employable in conjunction with the use of fluorescent sensitizers in solution, characteristic dilution curves for several sensitizer materials being shown; and FIG. 2 is a chart employable in conjunction with the use of the fluorescent sensitizers of the invention, the characteristic dilution curves for said sensitizers being shown.

Fluoranthene and pyrene have the same empirical formula; e.g., $C_{16}H_{10}$; however, their structural formulas are different, as shown by the following:

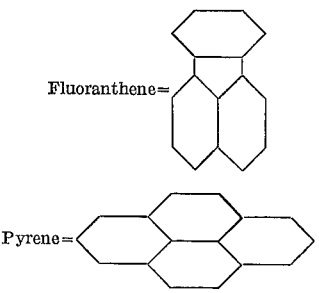

I have found that these two chemical compounds have several unique and useful properties, that is with respect to the tracer method of the invention. Firstly, they are completely insoluble in water, to the extent that they cannot be coupled into water solution. This feature is useful where it is desired to avoid any leaching of the fluorescent tracer from tracer-tagged materials which may come in contact with water.

Secondly, they have a broad range of solvency caracteristics which permits usage of either one or the other of the compounds as a fluorescent tracer in virtually any solvent liquid or resinous carrier with the exception of water. This feature is of great importance with regard to the fluorescence tagging of materials such as fluorocarbon liquids, silicones, and low kauri-butanol liquids such as jet engine fuels.

Thirdly, they have relatively "linear" dilution characteristics which are useful with respect to the establishment of reference standards for fluorescent tracer performance.

It has been found that all fluorescent dyes or sensitizer materials exhibit similar characteristics such that for a given concentration in a carrier there exists a critical film thickness below which fluorescence response diminishes substantially to zero. This critical film thickness is known as the dimensional threshold of the tracer-tagged material. The above-described effect of dimensional sensitivity has been described in detail in my above-mentioned patent, No. 3,107,298.

Referring now to FIG. 1, there is here illustrated a chart in which the dimensional threshold of fluorescence for a given sensitizer material is plotted as a function of its concentration, the result being that so-called dilution curves are produced similar to those illustrated. It should be pointed out that the scale of abscissus for the chart is set forth as a logarithmic scale of concentrations, in the unit measure of grams per pint, while the scale of ordinates is set forth as a linear scale in terms of "spot diameter" (in millimeters) in the so-called "Meniscus Method" test as described in my Pat. No. 3,107,298. The unit of measure, grams per pint, is employed for the reason that it is numerically about equal to pounds per gallon volume, thus permitting laboratory measurements to be readily transcribed into production quantities of material.

The above-mentioned Maniscus Method test utilizes a flat glass platen and a convex lens having a standardized radius of curvature of the lens surface. A drop of fluorescent test liquid containing a dissolved sensitizer and placed between the lens and platen will exhibit a nonfluorescent spot around the point of contact between the lens and platen. The diameter of this spot, in conjunction with the known curvature of the lens surface, may serve as a measure of the threshold film thickness of the test liquid below which fluorescence vanishes.

In the chart of FIG. 1, a number of dilution curves are shown which illustrate the fluorescence threshold response characteristics of various fluorescent dye sensitizers. Curve 1 shows the characteristics of C.I. Acid Yellow 7. Curve 2 shows the characteristic of C.I. Florescent Brightening Agent 48. Curve 3 shows the characteristic of C.I. Fluorescent Brightening Agent 29. Curve 4 shows the characteristic of C.I. Acid Yellow 73 (fluorescein). Curve 5 shows the characteristic of C.I. Fluorescent Brightening Agent 42.

The C.I. designations for the above-named dye materials are those listed in the Color Index (2nd ed. 1956, vols. 1 to 4), published by the Society of Dyers and Colourists, Dean House Piccadilly-Bradford, Yorkshire, England; the American Association of Textile Chemists and Colorists; and Lowell Technological Institute, Lowell, Mass., U.S.A. It will be noted that all of these characteristic curves are similar as to their disposition on the chart such that there is at least a segment of each curve which is approximately parallel to the diagonal line 6 which is employed in the chart as a reference line for defining levels of dimensional sensitivity in tracers. The dispositions of these dilution curves are typical of the various fluorescent dyes which are listed in the Color Index, in that the curves tend to rise steeply at concentrations below about 1 gram per pint.

Referring now to FIG. 2, there is here shown the characteristic dilution curves for the two chemical materials of the invention, curve 7 being illustrative of the dilution characteristic of fluoranthene, and curve 8 being illustrative of the dilution characteristic of pyrene. It will be seen that these dilution curves exhibit relatively long segments which are reasonably parallel to the diagonal reference line 6, which is the same in both figures. Curve 9 is illustrative of the dilution characteristic of fluoranthene in combination with a small amount of a fluorescent green color-former dye-sensitizer such as C.I. Florescent Brightening Agent 75. It will be noted that here again the dilution curve has a relatively long segment which is reasonably parallel to the diagonal reference line 6.

Many dyes are suitable for use as color-formers. These ordinary dyes or coloring materials, which are also listed in the Color Index, may be used in conjunction with either of the fluorescent compounds of the invention, the only requirement being that the color-former must be selected for its solubility in the same carrier in which the particular sensitizer of the invention is dissolved, as well as for its color characteristic.

There are numerous tracer applications in which the liquid fluorescent tracer material undergoes a dilution during use, and in which it is desirable that the dimensional sensitivity of the tracer be retained to the best possible degree under conditions of great dilution. Ordinary dye materials, such as C.I. Acid Yellow 7, for example, may exhibit bright fluorescence response under conditions of extreme dilution; however, the dimensional sensitivity or fluorescence response in thin films is rapidly diminished at low concentrations, being about 1 gram per pint, as will be noted from the curves of FIG. 1. On the other hand, the fluoranthene and pyrene sensitizers of this invention, may be diluted to a point where their concentrations are as little as .001 gram per pint, and the dimensional sensitivity or fluorescence response in thin films will not depart to an excessive degree from the diagonal reference line 6. It will be noted from curve 9 that the addition of a small amount of fluorescent color-former dye to a solution of fluoranthene, in this case 25% of color-former on the weight of fluoranthene, serves to improve the dimensional sensitivity or thin film response of the mixtures slightly, but the dilution curve of the mixture is still closely similar to that of solutions containing only fluoranthene.

In accordance with the known geometry of the Meniscus-Method test setup, which is described in detail in my Pat. No. 3,107,298, it is found that the film thickness $t$ at the threshold of fluorescence response may be determined from the relationship $$t = \frac{r^2}{2R}$$

where $r$ is the radius of the nonfluorescent spot in the Meniscus-Method test, and $R$ is the radius of curvature of the lens which is employed. Thus, it will be seen that for the two sensitizers of the invention, when employed in a mode of usage such that their concentrations range from about .001 gram per pint to about 25 grams per pint, the dimensional sensitivities or threshold film thicknesses will fall within the range of from about 3000 millimicrons to about 100 millimicrons.

The two chemical compounds of this invention, fluoranthene and pyrene, have been utilized in the past as scintillators responsive to nuclear radiation. For the most part, they have been employed in crystalline form, although in some cases they have been utilized in the form of solutions in xylene in concentrations of from about .3% to 2%. For such usage, the materials exhibit only nominal scintillation efficiencies compared to the more commonly used materials anthracene and p-terphenyl, their relative efficiencies being on the order of 9% and 7.5%, respectively, as compared to anthracene.

Fluoranthene and pyrene have not been utilized in the past for the production of fluorescent liquid-film tracer effects under ultraviolet excitation. This is possibly due to the fact that the materials provide relatively low brightness in their fluorescence response, as compared to other available fluorescent materials. Also, the compounds are not "dyes" in the accepted sense of such terminology, in that they exhibit no substantive bonding effects on textiles or similar materials. However, it has been discovered that the unique solubility effects exhibited by the compounds, as well as their unique dilution characteristics with respect to dimensional thresholds, far outweigh any shortcomings with respect to fluorescent brightness. The fact that the two substances are relatively inexpensive is also advantageous in connection with their usage in industrial liquid tracer applications.

The fluorescent chemicals of the invention, fluoranthene and pyrene, may be employed as fluorescent liquid tracers in a wide variety of applications. For purposes of this specification, the term "fluorescent tracer" refers to use applications in which there is employed a fluorescent substance dissolved in a suitable carrier liquid, and in which the thus-tracer-tagged material is activated by a source of ultraviolet light to produce a fluorescence response, as contrasted with usages wherein a fluorescence response is achieved by exposure of the substance to X-ray or nuclear radiation.

By virtue of their broad spectrum of solubility capability in different solvent liquids, the two chemical compounds of the invention may be dissolved in many kinds of solvents, and at least one or the other of the materials may be dissolved in virtually any material which can be prepared as a fluid or put in a fluid state with the assistance of a solvent medium; that is, with the exception of water solution, and, of course, liquid metals such as mercury and low melting point lead alloys. Thus, the compounds may be utilized as fluorescent tracers in many kinds of waxes, varnishes, oils, fuels, thermoplastic resins, thermosetting resins, surface coaters, and other materials. Among the various types of solvent materials which can be used to dissolve either one or both of the compounds are the following:

| | |
|---|---|
| Glycols | Silicones |
| Glycol ethers | Fluorocarbons |
| Ketones | Plasticizers |
| Esters | Chlorinated solvents |
| Mineral thinners | Liquid surfactants |
| Alcohols | |

The fluorescence response of materials tagged with the compounds of the invention, under ultraviolet excitation, may be employed to detect the presence of leaks in containers or pipelines, or unwanted residues, or contaminants, or it may be employed for purposes of identification or to demonstrate the presence of a tagged material where such is desired.

Example No. 1

A tracer concentrate was prepared in accordance with the following formulation:

Ethylene glycol monoethyl ether—2 gallons
Diethylene glycol monobutyl ether—2 gallons
Fluoranthene—3 lbs. 9 ozs.

The above tracer concentrate exhibits a bluish white fluorescence under ultraviolet excitation. One part of the above concentrate was added to 500 parts of jet engine fuel, and the fuel was put into a jet aircraft fuel tank. The jet engine was operated for a period of time, and the fuel lines and exterior areas of the fuel tank were inspected under ultraviolet light. Microscopically small leaks were revealed under the ultraviolet inspection as spots of bluish white fluorescence around the leakage points.

Example No. 2

A series of solutions were prepared using fluoranthene dissolved in N-methyl-2-pyrrolidone. The concentrations of the solutions were selected to conform to the values .001, .005, .01, .05, .1, .5, 1, 5, 10, 50, and 100 grams per pint. A series of Meniscus-Method tests were then set up in accordance with Pat. No. 3,107,298, each employing a few drops of the above-described test tracer liquids in proper order. Examination of the thus-prepared series of Meniscus-Method test setups under ultraviolet excitation showed that the nonfluorescent spots in the specimens were uniformly graduated in their diameters.

The above test liquids were used as reference materials in evaluating the equivalent Sensitivity Index, or active concentration, of a tracer-tagged fluorescent inspection penetrant by setting up a Meniscus-Method test for the penetrant liquid and determining by visual comparison the concentration of fluoranthene which provides a spot diameter most nearly approximating that yielded by the penetrant liquid being tested. A number of additional intermediate values of fluoranthene concentration were prepared and were utilized in the above-described visual comparison test. It was found that the equivalent fluoranthene concentration corresponding to the test penetrant liquid could be determined by visual comparison to an accuracy of about ±2% or better. It was found that the addition of about 10% of a fluorescent green color-former, C.I. Fluorescent Brightening Agent 75, on the weight of the fluoranthene could be added to the comparison test mixtures, and their fluorescent color response could be shifted to correspond closely to that of a fluorescent green inspection penetrant, thereby making visual comparisons of spot sizes more easily accomplished.

Example No. 3

A dye bath having the following formulation was prepared:

Pyrene—5 grams
Methylene chloride—¼ pint
Perchloroethylene—¾ pint

The thus-prepared dye bath was used as an identification marker for vinyl plastic materials such as credit cards, pass cards, and transparent photo cases. Plastic items to be marked were dipped in the dye bath, or marks were painted on the plastic surfaces. After staining with this dye bath, no evidence of any visible marking could be seen under ordinary light; however, under irradiation with ultraviolet light, it was found that the markings or stained areas showed up with a bright bluish white fluorescence.

Example No. 4

A fluorescent plastic composition for use as a surface coating was prepared having the following composition:

Fluoranthene—.1 gram
C.I. Fluorescent Brightening Agent No. 75—.01 gram
Polyester Resin (Laminac No. 4110, trademark, American Cyanamid Corp.)—1 pint To the above resin composition was added as a catalyst, 10 cc. of methyl ethyl ketone peroxide. The mixture was applied as a laminate between glass plates, a number of plaque specimens being prepared having varying film thicknesses of the polyester layer, and the laminated assemblies were cured to a hard consistency. It was found that the fluorescent plaques which were thus formed had varying degrees of fluorescent brightness, the thinner layers having the least brightness under blacklight excitation, and the thick layers having the greatest fluorescent brightness. The various fluorescent panels were then calibrated with respect to their fluorescent brightness values, in terms of foot-lamberts, under standardized conditions of ultraviolet irradiation.

The thus-calibrated fluorescent plaques were arranged in sequence in accordance with their brightness values, and they were then used as reference plaques for the evaluation by visual comparison of the fluorescent brightness performance of various fluorescent inspection penetrant liquids.

Although the invention has been described with reference to particular embodiments thereof, it will be understood that various changes may be made therein without departing from the spirit of the invention or the scope of the appended claims.

I claim:

1. In an inspection tracer process in which films of fluorescent tracer liquid are applied to test surfaces, irradiated by ultraviolet light, and observed by their fluorescence response, the improvement wherein said fluorescent tracer liquid consists essentially of a solution in a liquid solvent carrier of a water-insoluble, linear-response fluorescent tracer indicator which is relatively insensitive to changes in concentration, said tracer indicator being the substance fluoranthene, said fluoranthene being present in said liquid solvent carrier within the range of concentration of from about .001 gram per pint up to about 25 grams per pint.

2. In an inspection tracer process in which films of fluorescent tracer liquid are applied to test surfaces, irradiated by ultraviolet light, and observed by their fluorescence response, the improvement wherein said fluorescent tracer liquid consists essentially of a solution in a liquid solvent carrier of a water-insoluble, linear-response fluorescent tracer indicator which is relatively insensitive to changes in concentration, said tracer indicator being the substance pyrene, said pyrene being present in said solvent carrier within the range of concentrations of from about .001 grams per pint up to about 15 grams per pint.

3. An inspection tracer process in accordance with claim 1, in which said fluorescent tracer liquid contains an added color-former dye imparting a characteristic color to said tracer liquid.

4. An inspection tracer process in accordance with claim 2, in which said fluorescent tracer liquid contains an added color-former dye imparting a characteristic color to said tracer liquid.

References Cited

McLaughlin et al: J. Chem. Soc. (1960), pp. 3854–6.

TOBIAS E. LEVOW, Primary examiner

A. P. DEMERS, Assistant Examiner

U.S. Cl. X.R.

250—71